3,374,230
ACETYLATION OF STEROIDAL ALCOHOLS
WITH KETENE
John N. Gardner, Wayne, and Hershel L. Herzog, Glen Ridge, N.J., assignors to Schering Corporation, Bloomfield, N.J., a corporation of New Jersey
No Drawing. Filed Apr. 26, 1966, Ser. No. 545,243
6 Claims. (Cl. 260—239.55)

This invention relates to a novel process for esterifying a tertiary steroidal alcohol. More particularly, this invention relates to the process for the acetylation of a tertiary steroidal alcohol under basic conditions by means of ketene.

The invention sought to be patented is described as residing in the concept of acetylating a tertiary steroidal alcohol by reacting said tertiary steroidal alcohol with ketene in a basic medium at about room temperature whereby the tertiary steroidal alcohol is transformed into its corresponding acetate.

It is, of course, well know in the steroid art that esterification of steroidal alcohols often results in marked improvement in the activity and/or duration of effect of the parent alcohol. This has been found to be particularly true of the 17 - esters, 21 - esters and 17,21 - diesters of therapeutically active steroids. Techniques for achieving esterification of steroidal alcohols, therefore, are of great importance to the art.

Heretofore, esterification of steroidal alcohol groups, and particularly the relatively unreactive tertiary steroidal alcohol groups, required the treatment of the steroidal alcohol with esterifying agents such as acyl anhydrides or acyl halides in strongly acidic media or, alternatively, treatment of the steroidal alcohol with these esterifying agents under basic conditions (usually in the presence of tertiary amines such as pyridine) and at elevated temperatures for extended periods of time. Such means of esterification, however, are not entirely satisfactory, since the required reaction conditions are such as to give rise to undesirable side-reactions at other points on the steroid molecule including degradation of the cortical side chain, D-homo annulation, acid-catalyzed oxidation, and stripping of protective groupings from other esterifiable hydroxyl groups with simultaneous introduction of refractory and undesirable ester groups which are not readily removable in subsequent processing.

In an attempt to overcome the disadvantages noted above, many techniques applicable to the esterification of aliphatic alcohols have been considered. Included among these, for example, is the use of ketene as the esterifying agent, it having been found that acetylation of aliphatic alcohols with ketene may be effected under substantially neutral, or only slightly acid, conditions. Although readily applicable to acetylation of primary and secondary alcohols under these mild conditions, heretofore this technique has been found to be effective with tertiary alcohols only if the reaction is carried out in strongly acid media. For acetylation of tertiary steroidal alcohols, therefore, the ketene technique of the prior art presents the same difficulties previously noted.

The instant invention is based upon applicants' discovery that tertiary steroidal alcohols may be acetylated with ketene in basic medium. The reaction proceeds with good speed at or about room temperature giving yields of the desired acetate. Since the reaction conditions are relatively mild, the competitive side reactions associated with the prior art esterification techniques are substantially eliminated. The instant invention, therefore, constitutes a significant advance in the art of steroid synthesis.

Tertiary steroidal alcohols esterifiable by the process of the instant invention include those, for example, wherein the hydroxyl group appears at one or more of positions 5, 8, 9, 14 and 17 inclusive. The reaction, however, is one of general applicability and may be utilized to acetylate hydroxyl groups at other positions on the steroid molecule. 17α-ethinyl estradiol, for example, has a tertiary alcoholic group at position 17 and a co-appearing phenolic hydroxyl group at position 3; both such groups are esterifiable by the process of the instant invention. Further examples of steroids containing tertiary alcohol groups acylable by the instant process include such compounds as 14α - hydroxy -4- androstene-3,17-dione; 9α,17α-dihydroxy - 4 - pregnene - 3,20 - dione (9α,17α - dihydroxyprogesterone), 17α - ethinyl - 17β - hydroxy - 4 - androsten-3-one (17α-ethinyl testosterone), 3-methyl-3-hydroxy cholestane, 3β,7α,8α - trihydroxy cholestane and the like.

Further evidence of the significance of this invention resides in the fact that wherein the prior art processes for acetylation were inutile for the preparation of the 17β-acetate of 17α-ethinyl-3-methoxy-2,5-(10-estradien-17β-ol, an acid labile enol ether, by our process a facile conversion may be obtained. In similar manner, compounds such as Δ⁵-pregnen-17α-ol-3,20-dione 3-ethylene glycol ketal which possess acid labile groups are acetylated only with great difficulty by processes known in the art; they are by the instant process, acetylated easily without hydrolysis of the ketal function.

The basic medium employed in the instant process is achieved by the utilization of inert organic solvents, which itself may be basic or neutral and to which has been added a basic reagent. By basic reagents is meant alkali metal amides, hydrides and alkoxides, exemplary of which are sodium amide, potassium hydride, sodium methoxide, potassium tertiary butoxide and the like. We have found potassium tertiary butoxide or sodium hydride to be especially useful when utilized in the ratio of about 1 to about 20 moles of basic reagent per mole of steroid to be acetylated.

Inert organic solvents are defined as neutral or basic organic solvents which are essentially non-reactive with any of the reactants utilized herein under the conditions herein described. Representative of such inert organic solvents are the tertiary amines; straight chain, branched chain, cyclic and glycol ethers; di-substituted amides and aromatic hydrocarbons. Exemplary of such solvents are pyridine, triethyl amine, ethyl ether, isobutyl ether, dimethoxyethane, dioxane, tetrahydrofuran, dimethylformamide, benzene, toluene and the like.

The reactant ketene is well-known in the chemical art and is usually prepared, as needed, by the controlled pyrolysis of acetone. As such, it often is contaminated with small amounts of acetone vapor; this contaminant, however, is usually tolerated in the reaction mixture since it has no adverse effect. Ketene should be used as rapidly as possible after generation to prevent its polymerization which results in unavailability for the desired reaction.

In general, the instant process is performed as follows:

A tertiary steroidal alcohol is dissolved in an inert solvent, as described above and the reaction is carried out substantially at room temperature. The solution is blanketed with an inert gas such as, for example, nitrogen, helium or argon, and a basic reagent, of the type previously described is added with stirring. The inert gas tends to minimize the base catalyzed oxidations known to occur in steroid transformations. Ketene is added sub-surface and the addition continued until a suitable physical measurement on an acidified aliquot demonstrates the absence of starting material. The selection of a suitable physical measurement will in part depend upon the nature of the starting material involved. Among the many techniques which may be used are infrared spectroscopy, quantitative thin layer chromatography, polarimetry and the like. The acidification of the aliquot prior to measurement reverses any base catalyzed isomerization which may have occurred, particularly, in those steroids possessing a conjugated 3-ketone in Ring A.

When complete reaction has occurred, the reaction mixture is diluted with an organic solvent immiscible with water, a step not required if the reaction solvent itself is water immiscible. The reaction mixture is acidified, washed with a saturated sodium chloride solution, dried over anhydrous sodium sulfate and the solvent removed in vacuo. The resulting product is purified either by conventional recrystallization or by column chromatography or the combination thereof.

The following examples illustrate the process of the instant invention.

*Example 1.—$\Delta^5$-pregnene-3β,17α-diol-20-one-3β,17α-diacetate*

Dissolve 5.0 grams of $\Delta^5$-pregnene-3β,17α-diol-20-one-3β-acetate in 2.0 liters of dimethoxy ethane under a nitrogen atmosphere. Add to this solution 2.0 grams of potassium tertiary butoxide with stirring at room temperature. Pass ketene into the reaction mixture until no starting material is detectable on thin layer chromatography using chloroformethyl acetate 19:1 system. Add ethyl acetate to the resultant mixture and wash the organic solution with a saturated aqueous sodium chloride solution. Dry the ethyl acetate solution over anhydrous sodiumsulfate and evaporate the dried solution to a residue. Chromatograph the residue on 150 grams of activated magnesium silicate contained in 1" diameter glass column, eluting initially with hexane then with increasing percentages of ether until the product is removed from the column. Combine the fractions containing like products and crystallize from methanol then from isopropyl ether to obtain the product of this example.

*Example 2.—$\Delta^4$-pregnene-17α-ol-3,20-dione 17α-acetate*

Dissolve 5.4 grams of $\Delta^4$-pregnene-17α-ol-3,20-dione in 200 ml. of tetrahydrofuran with stirring under a nitrogen atmosphere. Add potassium tertiary butoxide 1.5 grams to the above solution. Pass ketene through the solution until no starting material is detectable on thin layer plates using chloroform-ethyl acetate 3:1 system. Add ethyl acetate to the resulting solution and acidify with acetic acid. Stir the acidified solution and wash with dilute sodium bicarbonate followed by saturated aqueous sodium chloride solution. Dry the organic solvent layer over anhydrous magnesium sulfate and evaporate the dried solution to a residue and chromatograph using the technique of Example 1. Combine the fractions containing like products and crystallize from methanol to obtain the product of this example.

*Example 3.—$\Delta^4$-pregnene-8β,17α,21-triol-3,20-dione-8β,17α,21-triacetate*

Dissolve 5.0 grams of $\Delta^4$-pregnene-8β,17α,21-triol-3,20-dione in 500 ml. of dioxane. Blanket the solution with a nitrogen atmosphere and add 2.0 gms. of potassium tertiary butoxide.

Introduce ketene into the reaction solution until the disappearance of the starting material demonstrated by the absence of a hydroxyl infrared absorption band. Dilute the reaction mixture with carbon tetrachloride and acidify with acetic acid. Wash the reaction mixture with dilute sodium bicarbonate solution then with a saturated aqueous sodium chloride solution. Dry the organic layer over anhydrous magnesium sulfate and concentrate the dried solution to a residue. Crystallize the residue from a suitable solvent to yield the product of this example.

*Example 4.—$\Delta^4$-pregnen-9α-ol-3,20-dione 9α-acetate (9α-acetoxy progesterone)*

Prepare a solution of 4.6 grams of sodium hydride in 1.5 liters of tetrahydrofuran in an atmosphere of argon. Add 9.8 grams of 9α-hydroxy progesterone and stir to effect solution. Introduce ketene sub-surface and continue the addition until the starting material disappears. Dilute with toluene and proceed as in Example 3 to obtain the product of this example.

*Example 5.—$\Delta^4$-androstene-14α-ol-3,17-dione-14α-acetate*

Add 3.7 grams of $\Delta^4$-androstene-14α-ol-3,17-dione to 740 ml. of pyridine and stir to effect solution. Continue stirring and add 2.0 grams of sodium methoxide. Bubble ketene into the stirred solution until the starting material is fully utilized as determined by infra-red examination of an aliquot as described below. Remove an aliquot, acidify with acetic acid, extract with methylene chloride and wash with dilute sodium bicarbonate followed by a saturated aqueous sodium chloride solution. Dry the organic layer over sodium sulfate, filter and evaporate to a residue. Completion of reaction is evidenced by lack of hydroxyl absorption in the infrared. Isolate the product by treating the reaction mixture in the same manner as the aliquot.

*Example 6.—Estrone 3-acetate*

Dissolve 10.0 grams of estrone in 1.0 liter of dimethylformamide and add 7.0 grams of potassium tertiary butoxide to the solution prepared above. Agitate the solution thus obtained while concurrently introducing ketene and argon to the reaction mixture. Continue the ketene and argon addition until the estrone is completely esterified then process as in Example 3 to yield estrone 3-acetate.

From the foregoing disclosure, it will of course be obvious to one skilled in the art that esterifying agents of the ketene family may be used in the instant process. It will be apparent, for example, that ketene dimer, dialkyl-, aralkyl-, diaryl- and dihalo-ketene may be employed as described herein to produce analogous esters. These ketenes are well known in the art and are readily prepared by conventional techniques from readily available precursors. The esters formed by their reaction with tertiary steroidal alcohols are substituted acetates. Thus, for example, dimethyl ketene gives rise to dimethyl acetates (i.e., isobutyrates); dichloroketene yields dichloroacetates; and dibenzyl ketene yields dibenzyl acetate. The substituted ketene described above need not be symmetrical, that is, it need not have two identical substituents, but may be mono substituted or may bear two dissimilar substitutents. Thus, for example, methyl ketene yields propionates while methyl-ethyl ketene yields 2-methyl butyrates. Applicants consider all such reactants to be the full equivalent of ketene as disclosed and utilized herein.

The subject matter which applicants regard as their invention is particularly pointed out and distinctly claimed as follows:

1. The process for acetylating a tertiary steroidal alcohol which comprises contacting said tertiary steroidal alcohol with ketene in a basic medium comprising a member selected from the group consisting of alkali metal alkoxides, alkali metal amides and alkali metal hydrides in an inert organic solvent, 2. The process of claim 1 wherein the treatment is carried out substantially at room temperature.

3. The process of claim 1 wherein the reaction is carried out under an inert atmosphere.

4. The process of claim 1 wherein the basic medium comprises potassium tertiary butoxide in an inert organic solvent.

5. The process of claim 1 wherein the basic medium comprises sodium amide in an inert organic solvent.

6. The process of claim 1 wherein the basic medium comprises sodium hydride in an inert organic solvent.

References Cited

FOREIGN PATENTS 224,277  11/1962  Austria.

LEWIS GOTTS, *Primary Examiner.*

E. LOVE, *Assistant Examiner.*